Sept. 14, 1943.  H. B. TUTHILL  2,329,669
LABEL ATTACHING MACHINE
Filed March 29, 1943  4 Sheets-Sheet 2
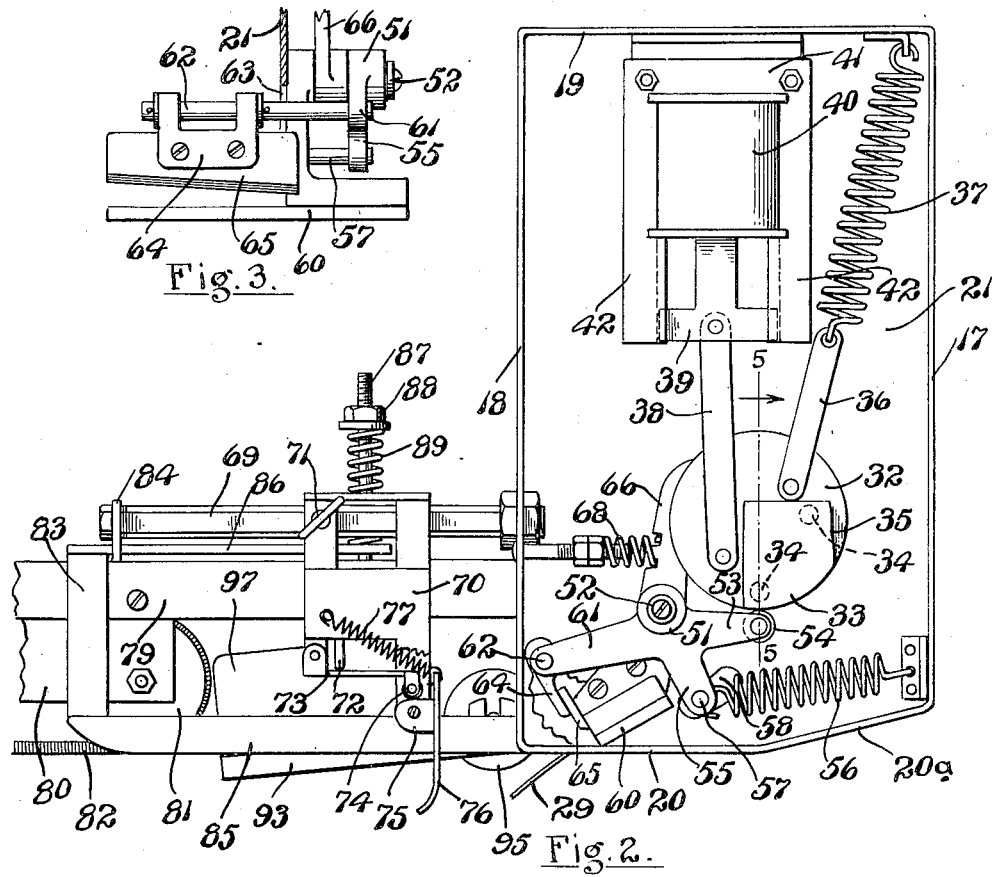
Inventor
Howard B. Tuthill
By Liverance & Van Antwerp
Attorneys.

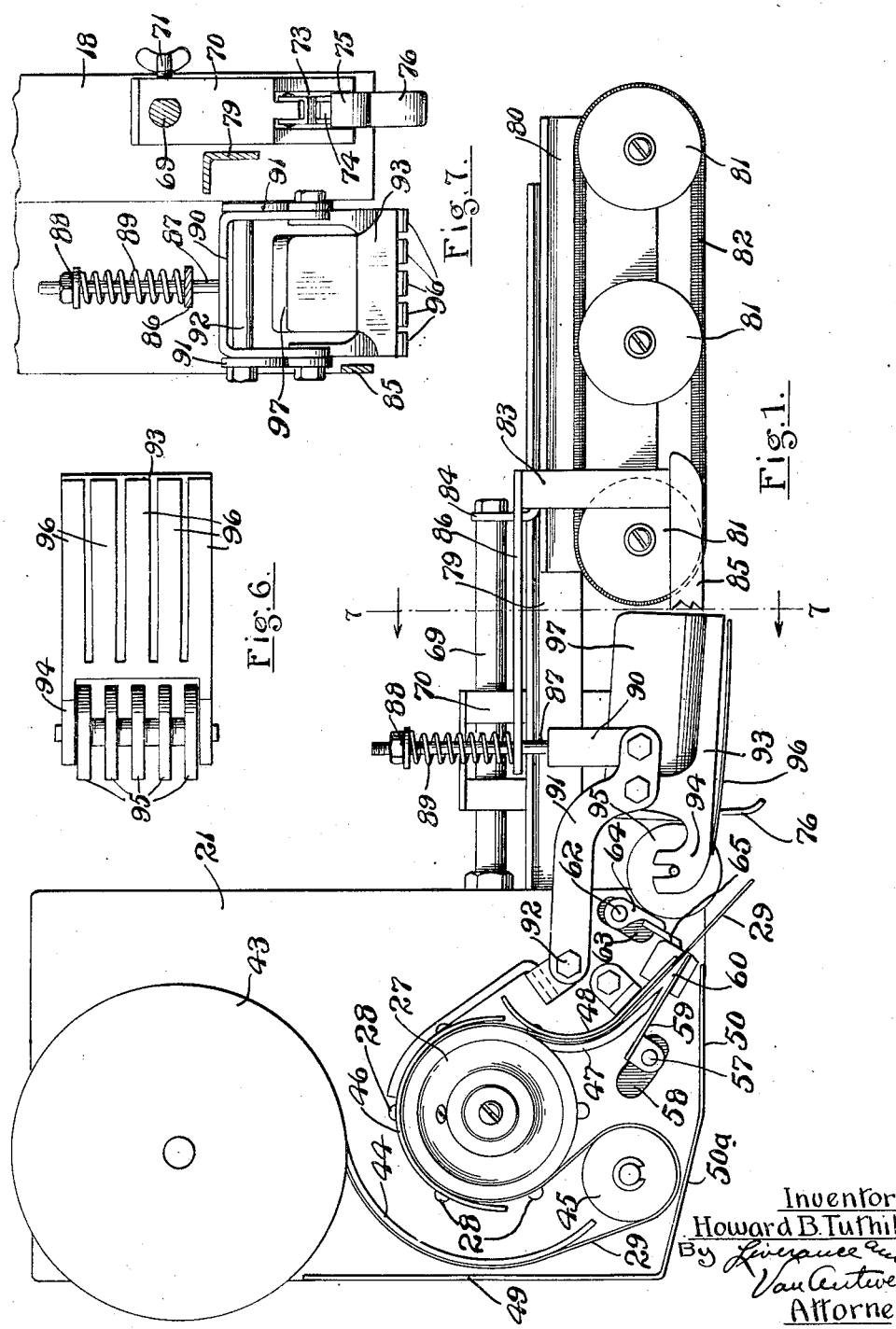

Sept. 14, 1943.   H. B. TUTHILL   2,329,669
LABEL ATTACHING MACHINE
Filed March 29, 1943   4 Sheets-Sheet 3

Inventor
Howard B. Tuthill
By Liverance & Van Antwerp
Attorneys

Sept. 14, 1943.     H. B. TUTHILL     2,329,669
LABEL ATTACHING MACHINE
Filed March 29, 1943     4 Sheets-Sheet 4

Inventor
Howard B. Tuthill
By Liverance & Van Antwerp
Attorneys

Patented Sept. 14, 1943

2,329,669

UNITED STATES PATENT OFFICE 2,329,669

LABEL ATTACHING MACHINE

Howard B. Tuthill, Grand Rapids, Mich., assignor to Oliver Machinery Company, Grand Rapids, Mich., a limited partnership of Michigan Application March 29, 1943, Serial No. 480,901

14 Claims. (Cl. 216—29)

This invention relates to a label attaching machine primarily designed for attaching labels to wrapped articles or packages. With such machine the articles or packages which have been previously wrapped are moved one following another over a suitable horizontal support or table associated with which is the label attaching machine of my invention. As the wrapped articles or packages are thus moved, each serves to trip mechanism to accomplish the severing end labels in succession from a continuous strip of labels, a label being deposited upon the outside of the wrapper which is around each article or package, depositing the label at a preselected desired position, following which the wrapped article with the label accompanying it and held against the wrapper is sealed and permanently secured to the wrapper and passes from the machine. Succeeding packages or articles following thereafter similarly trip the mechanism for its operation to attach labels successively thereto.

It is a primary object and purpose of the present invention to provide a very practical, relatively simple and very useful and efficient machine for the purposes stated. Such machine may be adjusted in accordance with articles and packages of different dimensions so that the machine is substantially universal in its application to all sizes and dimensions of wrapped packages within a relatively wide range of sizes.

An understanding of the invention may be had from the following description taken in connection with the accompanying drawings, in which, Fig. 1 is a side elevation of the label attaching machine, some parts being broken away for a better disclosure.

Fig. 2 is a similar elevation at the opposite side of the machine.

Fig. 3 is an elevation detail illustrative of the immediate label severing means.

Fig. 4 is a vertical section on the plane of line 4—4 of Fig. 5, looking in the direction indicated.

Fig. 5 is a fragmentary vertical section substantially on the plane of line 5—5 of Fig. 2 looking in the direction indicated by the arrows.

Fig. 6 is an under plan view of the heating element for cementing the labels.

Fig. 7 is a vertical section substantially on the plane of line 7—7 of Fig. 1 looking in the direction indicated.

Like reference characters refer to like parts in the different figures of the drawings.

The wrapped packages 1 (Fig. 8) are moved in the direction indicated in any suitable manner over a horizontal support or table 2, there being conventionally shown spaced apart bars 3 engaging against the packages, which bars may be associated with endless conveyor chains or other suitable moving means whereby the packages are moved over the table. Such packages are spaced a distance from each other, and while shown as substantially equally spaced, such equal spacing is not essential.

Figure 10:
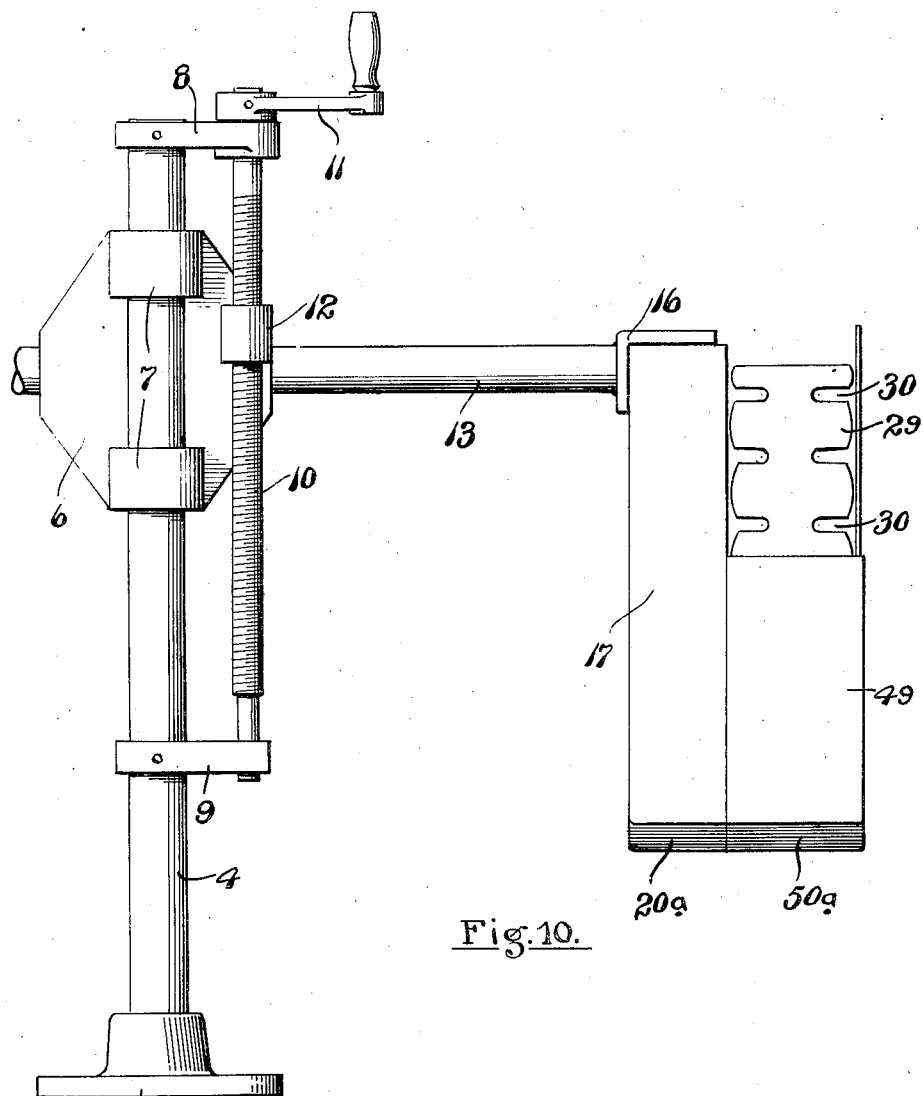
Fig. 10 is an elevation showing the support for the label attaching machine by means of which it is adjusted vertically and horizontally to any desired position.
Figure 11:
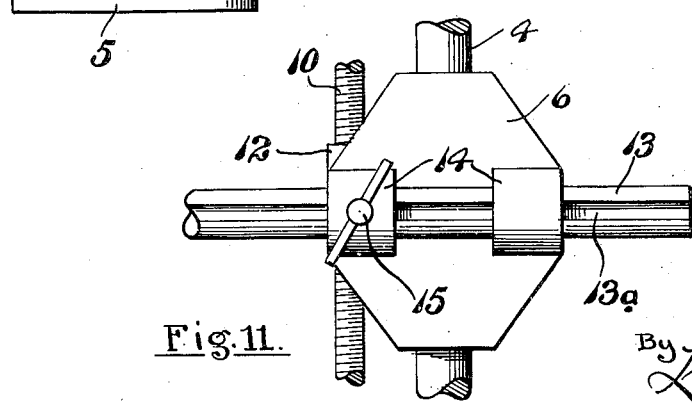
Fig. 11 is a fragmentary rear elevation thereof.

The labeling machine, as disclosed, is utilized to apply labels at the upper sides of the wrapped articles, and is adapted to be carried and adjustably supported upon a vertical post 4 (Fig. 10) which has a base 5 to be secured to any suitable under support at a proper height that the labeling machine may be located over the succession of wrapped articles moved horizontally beneath it. A plate 6 is provided with vertically spaced guides 7 through which the post 4 passes. Upper and lower brackets 8 and 9 are secured to the post on which a threaded shaft 10 is mounted for rotation to be turned by a crank 11 at its upper end. The shaft passes through an interiorly threaded sleeve 12 attached to the plate 6 it being evident that on rotation of the shaft 10 said plate 6 may be raised or lowered in accordance with the direction of rotation of the shaft.

At the opposite side of the plate 6 two spaced guide sleeves 14 are secured through which a horizontal supporting rod 13 is guided. The rod 13 is provided with a groove 13a and one of the guide sleeves 14 with a manually operable set screw 15 threaded therethrough to engage in the groove to hold rod 13 against rotation and in any position to which it may be horizontally adjusted.

The labeling machine is carried at an end of the rod 13 (Fig. 10), said rod being equipped with a bracket 16 which is welded or otherwise connected at the upper end of the housing of the machine. The housing of sheet metal includes a rectangular frame having vertical sides 17 and 18, a horizontal top 19 and a bottom 20, one end portion of which is inclined upwardly as at 20a. At what may be denoted as the front side of this surrounding frame, a sheet metal plate 21 is provided integral with or suitably connected with the parts 17, 18, 19 and 20 on which, at opposite sides thereof, a large portion of the mechanism of the labeling machine is mounted.

A sleeve 22 (Fig. 5) passes through the plate 21 having between its ends but adjacent its rear end a disk 23 integral therewith, in the periphery of which a plurality of spaced concaved recesses 24 are formed. On the rear end of the sleeve and against the disk 23 a ratchet wheel 25 is mounted and rigidly secured in place so as to turn with the sleeve and disk. The sleeve 22 passes through a hub 26 permanently connected at one end to the plate 21 and extending forwardly therefrom, said sleeve being rotatably mounted thereon. A drum 27 is connected to the projecting forward end portion of the sleeve 22 to turn therewith. The drum is provided at its peripheral portions with spaced pairs of radially projecting pins 28.

The drum 27 is to drive the label strip which consists of a succession of labels 29 in a continuous strip, the strip being notched or slotted inwardly at each of its edges at spaced apart distances, as at 30, leaving intermediate narrow integral connections between the successive labels. The projecting pins 28 are properly spaced to enter the slots 30, and upon rotation of the drum, move the label strip through the engagement of said pins with the strip as is evident.

A rod or shaft 31 passes lengthwise through and has a rotative bearing in the sleeve 22. At its rear end it carries a disk 32 in rigid connection therewith which lies alongside the ratchet wheel 25, on which a dog 32a is pivotally mounted in engagement with the ratchet wheel. At the outer or rear side of the disk 32 a cam block 33 is mounted and held spaced a short distance from the disk 30 by spacing sleeves 34. The plate 33 has an arcuate edge of the same radius of curvature as the disk 32, and at one end of said arcuate edge is the side 35 (Fig. 2) the purpose of which will hereafter be described. A link 36 is pivotally connected at one end at a point away from the center of the disk. A coiled tension spring 37 is connected with the outer end of the link 36 at one end, its opposite end being secured to the top 19 of the housing frame.

A second link 38 is likewise pivotally connected at one end to the disk 32 away from its center and extends upwardly to and has a pivotal connection at its upper end with an extension 39 to the armature of a solenoid 40. The solenoid is mounted upon a plate 41 in turn suspended from the upper side 19 of the housing, which plate at the lower portion is cut away to provide spaced depending guides 42 for the lower end of the armature extension 39 in its movements upwardly upon the armature being energized and downwardly when the energizing current is interrupted.

The length of connected labels is rolled into a roll and placed on a spool 43 which is rotatably mounted at the front side of the plate 21. The labels are led over a curved guide 44 to and underneath an idle roller 45 (Fig. 1) and thence over the drum 27 underneath a shield 46 as shown. From the drum 27 the connected labels pass between guides 47 and 48 and thence downwardly and outwardly to and beyond the point where the severing knives are mounted for successively cutting the labels, one at a time, in a manner hereafter described. As shown, a vertical plate 49 in the same plane with the vertical side frame members 17 and an under plate 50 with an upwardly inclined section 50a in the same planes with the under plate 20 and its upwardly inclined section 20a may be used though not essential, and the mechanism which has been described as located at the front of the plate 21 may be covered by a cover plate attached to the parts 49 and 50, not being shown in the present disclosure as in no way essential to its operation.

At the rear side of plate 21 a sleeve 51 is pivotally mounted upon a suitable shaft 52 and from said sleeve three arms angularly disposed with respect to each other extend. The first of said arms, 53, (Fig. 2), extends horizontally toward the cam plate 33 and has a roller 54 at its end which bears against the edges of said plate 33. The second arm 55 extends downwardly and has associated therewith a coiled spring 56 connected to move said arm counter-clockwise and secured at one end to the housing. A pin 57 near the end of the arm 55 extends through a slot 58 in plate 21 and at the front side of said plate 21 has a member 59 secured thereto which extends downwardly toward and underneath the label strip (Fig. 1) passing over a fixed member 60 of the label severing mechanism used. The third arm 61 extends opposite to the arm 53, and adjacent its end has a pin 62 which passes through a slot 63 in plate 21 on which a bracket 64 is pivotally mounted, carrying a cutting blade 65 normally located above the label strip and which on downward movement passes across said strip and in conjunction with the part 60 severs end labels successively therefrom. The bracket 64 may be yieldingly urged by any suitable means in a direction to hold the knife 65 in proper position that when it is moved downwardly it will cooperate with the under blade 60, insuring that the labels will be completely and accurately severed.

It is to be understood that upon rotation of the disk 32 in a clockwise direction (Fig. 2) the arcuate edge of the plate 33 rides over the roller 54 until the back edge at 35 is reached whereupon, under the influence of the spring 56, the arms 53, 55 and 61 are moved counter-clockwise with a quick downward severing movement of the blade 65 across the label strip.

Upon the same stud shaft that carries sleeve 51 an arm 66 is pivotally mounted extending upwardly and carrying a roller 67 which rides against the edge of the recessed disk 23, the roller being adapted to be received in the notches 24 thereof. Arm 66 is acted upon by a compression spring 68 to hold roller 67 against the disk.

A horizontal rod 69, flattened at one side (Fig. 2), is permanently mounted at one end on the side 18 of the housing frame. On the rod a switch carriage 70 is slidably mounted and when in a desired position held securely by a set screw 71. The carriage 70 depends below the rod 69 and may be of any suitable construction having a movable switch member 72 (Fig. 2) the moving of which in one direction closes the switch of an electric circuit (not shown) in which the solenoid winding 40 is interposed, whereby when the circuit is closed the winding is energized and elevates its armature with a consequent vertical movement of the bar 38 causing a partial rotation of the disk 32. At the lower end of the switch carriage 70 a lever 73 is pivotally mounted at one end against which the movable switch member 72 bears. The other end of the lever 73 has a roller 74 riding upon a lug 75 pivotally mounted at a lower point and at the opposite side of the carriage 70. A trip 76 is connected with the lug 75, the lower end of the trip extending below the labeling machine, so as to be pivotally turned by the wrapped articles 1 in succession as they come to it, as in Fig. 8. Such turning of the trip against the spring 77 (Fig. 2), which normally returns the trip to its initial position, serves to close the switch and hold it closed until movement of the article 1 past the trip releases it to return to its initial position ready to be engaged by the next succeeding article.

An angle bar 79 is secured to the vertical member 18 of the machine housing to one side of and slightly below the bar 69 (Fig. 7). At the outer portion of bar 79 a plate 80 is connected and depends, upon which a plurality of grooved rollers 81 are mounted. Endless coiled-spring belts 82 pass around the rollers as shown, the lower runs of the belts being located substantially in the plane of the lower sides 20 and 50 of the housing described. The innermost of the rollers 81 is spaced a distance from the point where the labels are severed from the label strip, and in this space the label sealing apparatus is positioned.

An inverted U-shaped stirrup 83 is secured to and has its upper horizontal portion lying against the supporting bar 79, an upwardly projecting tongue 84 from the stirrup serving to support the outer end of the bar 69. At the lower ends of the stirrup 83, horizontal frame bars 85 are connected which extend to and are connected at their opposite ends to the housing. A horizontal bar 86 is permanently secured to the upper side of the stirrup 83 and extends toward the housing, through which a rod 87 passes, threaded at its upper end to receive a nut and washer 88, and with a coiled compression ring 89 around the rod between the washer and the bar 86.

At the lower end of the rod 87 an inverted U-shaped yoke 90 is connected, to the lower ends of the arms of which one end of each of a pair of links 91 are secured, the other ends of said links having a pivotal support indicated at 92 (Fig. 1). A sealing plate 93 is pivotally suspended from and between the links 91. Said sealing plate at the end toward the machine housing has two spaced arms 94, between which a shaft is rotatively mounted, integral with or secured to which are a plurality of spaced narrow rollers or disks 95. At the under side of the sealing plate thin metallic spring fingers 96 spaced from each other and integrally connected at one end are mounted, being readily yieldable in an upward direction upon pressure applied thereto. The sealing plate is heated by an electric coil disposed above it indicated at 97, and normally the plate is overbalanced about its pivot because of the weight of the coil tending to turn downwardly in a clockwise direction.

The wrapped article in its movement to the right (Fig. 8) comes against the trip 76, completing the electric circuit which includes the solenoid winding 40, whereupon the armature is elevated, disk 32 rotates in a clockwise direction (Fig. 2) which carries the dog 32a (Fig. 4) back over the ratchet tooth next behind the one with which it had been engaged. As soon as the movement of the disk 32 and its connected cam plate 33 has proceeded far enough that the roller 54 may ride against the side 35 of said plate, a movement of the several arms 53, 55 and 61 occurs under the influence of spring 56, severing knife 65 moving downwardly and severing the end label 29 of the label strip and depositing it upon the article which has actuated the trip 76.

Figure 8:
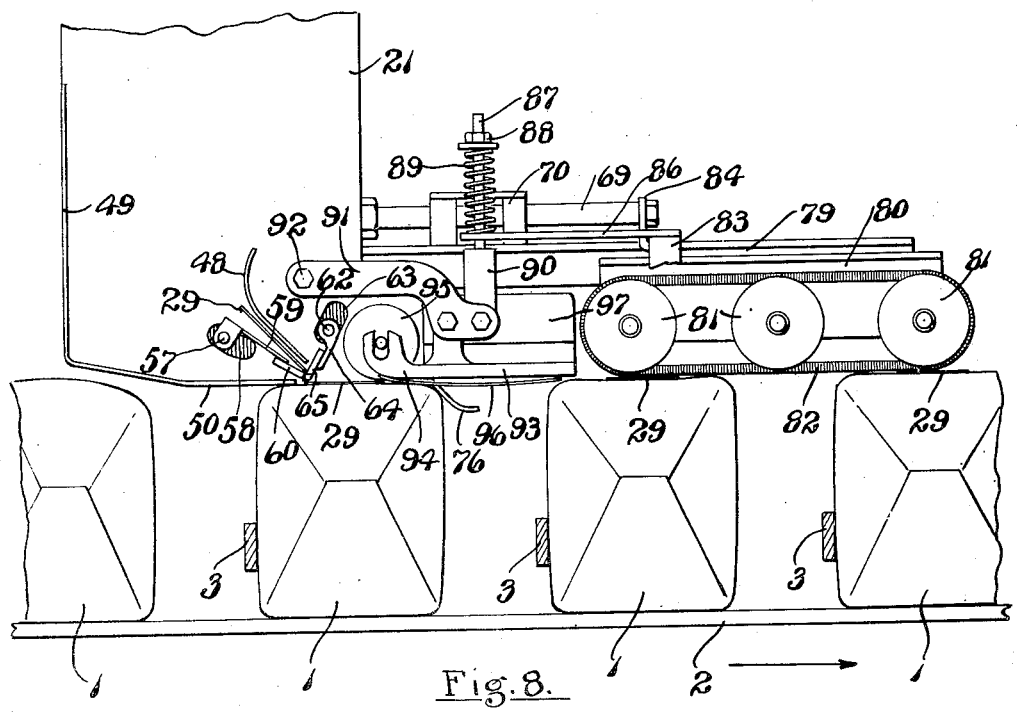
Fig. 8 is a view somewhat similar to Fig. 1 indicating the manner in which wrapped articles are passed in succession in the direction indicated to have labels successively applied thereto.
Figure 9:
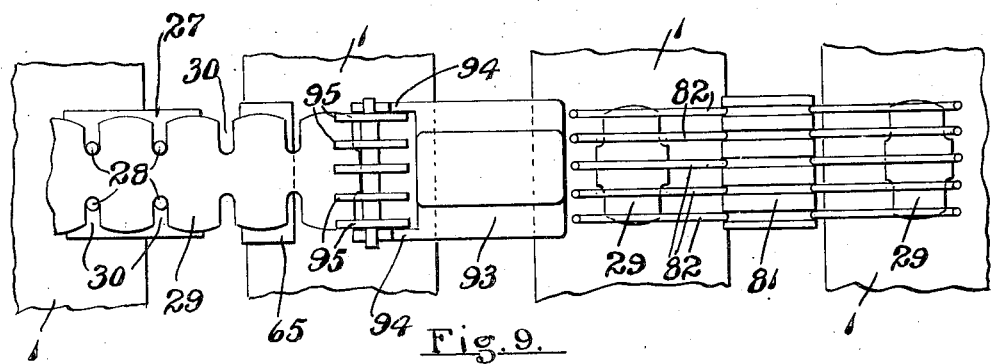
Fig. 9 is a diagrammatic layout of the successive steps of the label attaching process followed.

The circuit including the solenoid remains completed until said wrapped article has passed by and released the trip 76 to return from the position shown in Fig. 8 to that shown in Figs. 1 and 2. The downward movement of the severing blade 65 is accompanied by a withdrawal movement of the member 59 from the position in Fig. 1 to that shown in Fig. 8.

As shown in Fig. 8 the edge of the end label immediately prior to its severance has been elevated to underneath the roller 95, and after severance, with the continued movement of the wrapped article to the right, is held against the upper side of the article by said roller until the label is brought underneath the yielding fingers 96 which are subjected to the temperature and heat of the plate 93. Said fingers yield and come in direct contact with the lower side of the heating plate 93 whereby the label in its passage underneath the plate is heated for cementing to the wrapper of the wrapped article. It is of course to be understood that the labels of the label strip are coated at the sides thereof which engage against the wrappers with a suitable cementing composition, usually of a thermoplastic nature, which subjected to the temperature of the sealing plate melts or otherwise softens the composition to cause it to adhere strongly to the wrapper.

When the article has had its label thus subjected to heat to provide a cementing condition of the cementing material used, upon passing beyond the heating plate the label is pressed against the wrapper for a period of time that it takes to move the articles the length of the lower run of the yielding coil spring belts 42. The wrapped articles bearing against the lower runs of said belts, by friction move the belts, and turn the idle grooved rollers 81 on which they are mounted. During this time the cementing material on the labels will cool sufficiently that upon moving beyond the belts 82 there is no danger of the labels being accidentally or otherwise misplaced. Pressure exerted by such yielding coil steel belts against the upper side of the labels holds them snug against the wrapper, insuring that there is no separation of the label during the time that the adhesive is being changed from a hot easily separated condition to a cooled snugly adhering condition.

Upon the trip 76 being released and returning to its normal position, the electric circuit of the solenoid 40 is broken, whereupon spring 37 which has been stretched, is released to turn the disk 32 back to its initial position. It is to be understood that in the turning of said disk 32 by solenoid operation, the dog 32a will move in a direction from the position against the tooth of the ratchet wheel 25 (as in Fig. 4) over and a distance beyond the next succeeding tooth. The first action which occurs upon counter-clockwise movement of the disk 32 under influence of the spring 37 is to move the cam plate 34 so that the roller 54 is carried from the edge 35 to the arcuate edge of said plate. This causes the immediate return of severing blade 65 to its upper position, and a simultaneous movement of the thin plate 59 from retracted position in Fig. 8 to that in Fig. 1, such movements occurring before the dog 32a comes against the tooth of the ratchet wheel. If, as might occur because of the adhesive at the under side of the label strip (Fig. 1), it should adhere to the lower cooperating cutting member 60, the end label will be freed by the member 59 on its return to initial position, By the time this operation has been completed disk 32 will have moved in its return so that the dog 32a will engage the notch of ratchet wheel 25 over and beyond which it had passed. With a completion of the movement of the disk 32, the ratchet 25 is rotated one step with a consequent rotative one step movement of the drum 27 and a projection of the end label 29 of the label strip into position for its severing upon the succeeding article coming to and tripping the trip 76, causing a repetition of the cycle of movements which have been described.

It is of course evident that for the return of the trip 76 from the angular position to which it is moved, as in Fig. 8, to the vertical position shown in Fig. 2, ready to be engaged by the next succeeding article, space is required between the successive articles. But inasmuch as the trip is not actuated until the wrapped article to be labeled comes against the trip, the width of the space, other than that necessary for the return of the trip to initial position is not important, nor do the spaces between articles need to be equal.

It is further evident that by adjusting the switch 70 to different positions on the rod 69 the position of the label in the width of the article on which it is attached can be varied. The label may be placed midway between the vertical sides of the article, nearer one side than the other and, if desired, with suitable modification in the heating member, at either corner thereof, partly on top of the article and partly on the side. By adjustment of the rod 13 carrying the labeling machine the position of the wrapper in the length of the article may be adjusted or varied. Articles of different heights, widths and lengths may have labels applied on proper adjustment of the machine as a whole, making it available for use in conjunction with articles of an indefinite number of dimensions.

The machine is also capable of handling labels of different lengths and widths, by merely making interchangeable drums 27 of different diameters and lengths with immediately associated parts changed to correspond and by using interchangeable knives 65 of different lengths. A change in the diameter of the drum 27 with like positionings of the pins 28 on the several drums will take care of the different widths of labels used while the lengths of the labels may be taken care of by different lengths of drums and different lengths of the label severing knives. Thus in the same machine an indefinite number of labels of different dimensions may be used.

While the labeling machine has been disclosed as positioned over the passing articles underneath, such machine is adapted to be located horizontally at one end of the articles which are moved past it so that labels may be attached at such end of the wrapped articles. Two such machines may be located horizontally and spaced apart with the articles passing between for the attachment of labels at both ends of the articles. Furthermore it is evident that by positioning the article to pass lengthwise of the conveyor instead of transversely thereof labels may be applied to one side of each of said articles where one horizontally positioned machine is used or to both sides of such articles using two of the machines located horizontally and spaced from each other. The invention has been disclosed in a practical useful embodiment of a machine which has been very successfully operated. The articles shown indicate wrapped loaves of bread, but the utility of the machine is not restricted thereto as wrapped boxes and various other packages of wrapped articles may have the labels applied thereto. Furthermore, it is evident that a container, carton or box in which articles may be placed may have the labels applied to said boxes or other containers without necessity of wrapping, or before wrapping if desired. The invention is not to be restricted in its use to any particular field of use but is the same invention irrespective of what use to which it is put, so long as it is available and applicable to such use. Neither is the invention to be restricted to the specific disclosure shown and described. Variations in detail of structure and substitution of equivalents for operative elements thereof are comprehended by the invention, insofar as it is set forth and claimed in the appended claims defining such invention.

I claim:

1. In a labeling machine adapted to be placed in conjunction with articles moving past said machine, of a trip successively operated by said articles in their passage, means operable by the actuation of said trip for rendering a label feeding and cutting mechanism operable to cut a previously fed end label from a continuous connected length of labels and applying it to said article actuating the trip and locating it thereagainst, and after such cutting for feeding the label strip the distance of a label to position an end label for severing and application to a succeeding article, and means for bonding the applied label to said article against which it has been placed upon further movement of said article, as specified.

2. In a labeling machine adapted to be located in conjunction with articles of rectangular parallelopiped form moved past said machine in spaced apart relation to each other, of a trip successively engaged by said articles to actuate said trip and hold it in actuated position until the article has passed, said trip returning to its initial position in spaces between said articles for actuation by the next succeeding article, means for supporting a continuous length of connected labels, means for guiding the end label into a position to be applied against a surface of the trip actuating article, means rendered operable by the article actuation of said trip for severing the end label in a position for application to a surface of said article and for subsequently moving the labels to position the succeeding end label in the position occupied by the severed label before it was severed, and bonding means located beyond the trip in the direction of movement of the articles to which said articles, each with a label against the surface thereof, are successively brought to cementitiously bond said labels to said articles, as specified.

3. A label applying mechanism having a means for mounting and guiding a continuous strip of connected labels to articles of rectangular parallelopiped form moved by said mechanism, means actuated by each article in passing by said mechanism for severing an end label in succession from said strip and for thereafter feeding the strip between severings to position for the next succeeding severing of an end label, each label upon severing being positioned against a surface of a passing article, and each passing article by its actuation of said means causing the feeding of the label strip to properly position the end label for severing and application to the next succeeding article, and means for bonding the label to each article after said label has been severed.

4. A label applying mechanism at a side of which articles are moved one after another past the mechanism, including means for supporting and guiding a strip of connected labels into position such that the end label of said strip is successively fed into position for application to each of said articles as each passes by the immediately preceding articles, means tripped and rendered operative by each article in its movement past said mechanism for severing said end labels and subsequently feeding said label strip between severings of the labels, and means for sealing said labels one for each article against a surface of its respective article after said severing thereof.

5. A label applying mechanism comprising, means for feeding a connected series of labels to moving articles to which the labels are to be applied, trip means actuated successively by each moving article for severing and positioning a label against a surface of the article and subsequently feeding the labels to operative position for severing to supply a label to the next succeeding article, and means for heat bonding each label to its respective article on continuation of movement of the article after a label has been positioned against a surface thereof.

6. In a labeling machine adapted to be placed in conjunction with articles moved past said machine, a trip successively operated by said articles in their passage, means operable by the actuation of said trip for rendering a label feeding and cutting mechanism operable to cut an end label from a continuous length of labels for application to each article actuating the trip and locating it thereagainst, and for thereafter feeding the label strip the distance of a label to position the next succeeding end label for severing and application to a succeeding article, means for heat bonding a severed label positioned against a surface of an article to said surface, and means for pressing said label after heat bonding the same against said surface for a period of time until said label has cooled.

7. In a labeling machine adapted to be placed in conjunction with articles moving past said machine, of a trip operable in succession by said articles as they pass, means operated by the actuation of said trip for rendering a label feeding mechanism operable for cutting an end label from a continuous length of labels and positioning a label against a surface of each article actuating the trip, and for thereafter feeding the label strip the distance of a label to position the succeeding end label for severing and application to a succeeding article prior to such succeeding article coming to and actuating the trip, said labels at the sides thereof against the articles being covered with a heat affected sealing substance, a heated plate against which the labels positioned against the surfaces of articles are pressed and past which said articles and labels move, a plurality of endless yielding belts against which said labels and the surfaces of the articles to which applied press upon movement of the articles beyond said heating plate, and rollers carrying said belts whereby the belts are actuated by the pressure of the articles thereagainst and hold the labels snugly against the surfaces to which applied.

8. In a labeling machine, a switch, a trip, operation of which closes the switch, said trip being adapted for actuation by the passage of articles in succession, means to return the trip to initial position upon the passage of an article, a solenoid adapted to be energized upon said switch closing, a rotatably mounted disk, connection between said disk and the solenoid armature for turning the disk, spring means connected with the disk for returning it to original position upon breaking said switch on release of the trip, a cam on said disk, a member having an arm bearing on said cam, spring means connected with said member for actuating the arm upon movement of the cam to a predetermined position, a second arm on said member, a cutting blade carried thereby, a cooperating cutter, a label feed for a continuous strip of connected labels, an end portion of said strip of labels being guided over said cooperating cutter, whereby an end label is severed upon actuation of said cutting blade, and means for actuating said label feed on the return movement of said disk, as specified.

9. A construction containing the elements in combination defined in claim 8, combined with means for adjustably mounting said switch and the trip carried thereby to position them in any selected position to thereby effect the operation of the trip at a selected position of said articles with respect to said label cutting means.

10. In a labeling machine, mechanism normally at rest for feeding a strip of labels in step by step movements the distance of the dimension of a label in the length of said strip and for severing the end label from the strip, an electric switch, electric solenoid apparatus for operating said feeding means in one direction upon closing the switch, spring means for returning said mechanism to initial position upon breaking said switch, and movable means carried by said switch adapted to be actuated by the movement and passage of articles to which labels are to be applied in succession, said movable means extending into the path of movement of said articles.

11. In a labeling machine, mechanism normally at rest for feeding a strip of labels in step by step movements the distance of a dimension of a label in a length of said strip and for severing the end label from a strip including a rotatably mounted disk, means for rotating said disk in one direction a limited distance and for holding it against movement after rotation a predetermined distance, a cam on said disk, label severing means associated with said cam and held in inoperative position thereby until on rotation of the disk a predetermined position said cam is moved to release said label severing means, spring means for operating said label severing means upon release thereof, spring means for returning the disk to its original position upon release of the disk rotating means and a trip located in the path of movement of articles and actuated and held by said articles in succession for controlling and rendering operable said disk rotating means, the release of said trip occurring after an article has passed thereby.

12. In a labeling machine, mechanism normally at rest for feeding a strip of labels in step by step movements a distance the dimension of a label in a strip of labels and for severing the end label from the strip, feeding means for said labels, severing means for severing an end label upon operation of said mechanism, trip means actuated by articles moved past said labeling machine for rendering said label feeding and severing means operable, severing of a label being followed by the feeding of the label strip to position the end label thereof in the position of the label which has been severed for subsequent severing of the end label and a repetition of said label feeding upon the trip being engaged by the next succeeding article.

13. In a label applying mechanism, a severing means, means for feeding a connected series of labels in a strip to position an end label of said strip at a predetermined position to one side of said severing means, a connected strip of labels being at the opposite side thereof, means for moving articles to which the labels are to be applied past said label applying mechanism, trip means actuated successively by each moving article and means rendered operative by said trip means for actuating the severing means to sever said end label and deposit it against a surface of said article and thereafter feed the label strip the distance of the dimension of a label in the length of said strip to the predetermined position occupied by the severed end label.

14. A label applying mechanism comprising, means for successively and at intervals severing the end label from a continuous strip of labels, means for moving articles in succession, one after another past the label applying mechanism, trip means actuated by each of said articles as it is moved past the label applying mechanism for rendering effective the severing of said label and its application to the surface of the article operating the trip means and means for feeding the label strip after such severing of the end label to position the new end label in the position occupied by the severed label.

HOWARD B. TUTHILL.